(12) United States Patent
Miki et al.

(10) Patent No.: US 12,255,319 B2
(45) Date of Patent: Mar. 18, 2025

(54) POSITIVE ELECTRODE FOR LITHIUM ION SECONDARY BATTERIES, AND LITHIUM ION SECONDARY BATTERY

(71) Applicant: Vehicle Energy Japan Inc., Hitachinaka (JP)

(72) Inventors: Takeshi Miki, Ibaraki (JP); Yuki Takei, Ibaraki (JP); Yusuke Tachikawa, Ibaraki (JP); Shuichi Suzuki, Ibaraki (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 456 days.

(21) Appl. No.: 17/760,913

(22) PCT Filed: Nov. 12, 2020

(86) PCT No.: PCT/JP2020/042320
§ 371 (c)(1),
(2) Date: Mar. 16, 2022

(87) PCT Pub. No.: WO2021/095818
PCT Pub. Date: May 20, 2021

(65) Prior Publication Data
US 2022/0352505 A1 Nov. 3, 2022

(30) Foreign Application Priority Data
Nov. 15, 2019 (JP) .................................. 2019-207241

(51) Int. Cl.
*H01M 4/36* (2006.01)
*H01M 4/505* (2010.01)
(Continued)

(52) U.S. Cl.
CPC ........... *H01M 4/366* (2013.01); *H01M 4/505* (2013.01); *H01M 4/525* (2013.01); *H01M 10/0525* (2013.01); *H01M 2004/028* (2013.01)

(58) Field of Classification Search
CPC ...... H01M 4/366; H01M 4/505; H01M 4/525; H01M 10/0525; H01M 2004/028
(Continued)

(56) References Cited

U.S. PATENT DOCUMENTS

2005/0019659 A1* 1/2005 Shiozaki ................. C01G 53/50
429/223
2009/0035660 A1* 2/2009 Fujihara ................. H01M 4/366
429/231.95
(Continued)

FOREIGN PATENT DOCUMENTS

CN 104600244 A * 5/2015 ........ H01M 10/0525
CN 107431186 A 12/2017
(Continued)

OTHER PUBLICATIONS

Chinese Office Action issued on Jun. 17, 2023 for Chinese Patent Application No. 202080064687.9.
(Continued)

*Primary Examiner* — Ekandra S. Miller-Cruz
*Assistant Examiner* — Kevin Nguyen
(74) *Attorney, Agent, or Firm* — Volpe Koenig

(57) ABSTRACT

Provided is a positive electrode for a lithium ion secondary battery that suppresses both a decrease in discharge capacity and an increase in internal resistance due to charging and discharging. The positive electrode for the lithium ion secondary battery includes a positive-electrode current collector and a layered structure provided on the positive-electrode current collector, in which the outermost layer of the layered structure contains a first positive-electrode active
(Continued)

material represented by $Li_{1+X}M^AO_2$ wherein X satisfies $-0.15 \leq X \leq 0.15$, $M^A$ represents an element group including Ni, Co, and Mn, and the innermost layer of the layered structure contains a second positive-electrode active material represented by $Li_{1+Y}M^BO_2$ wherein Y satisfies $-0.15 \leq Y \leq 0.15$, and $M^B$ represents an element group including Ni, Co, and at least one of Mn or Al.

9 Claims, 6 Drawing Sheets

(51) Int. Cl.
  *H01M 4/525* (2010.01)
  *H01M 10/0525* (2010.01)
  *H01M 4/02* (2006.01)
(58) Field of Classification Search
  USPC .................................................. 429/231.9
  See application file for complete search history.

(56) References Cited

U.S. PATENT DOCUMENTS

| | | |
|---|---|---|
| 2018/0006291 A1 | 1/2018 | Kim et al. |
| 2019/0326590 A1 | 10/2019 | Yamamoto |
| 2020/0006767 A1 | 1/2020 | Du et al. |
| 2020/0403217 A1 | 12/2020 | Hoshina et al. |

FOREIGN PATENT DOCUMENTS

| | | |
|---|---|---|
| CN | 108933242 A | 12/2018 |
| CN | 110429252 A | 11/2019 |
| EP | 1469539 A1 | 10/2004 |
| JP | 10-255762 A | 9/1998 |
| JP | 2014-026777 A | 2/2014 |
| JP | 2016-213057 A | 12/2016 |
| JP | 2019-029205 A | 2/2019 |
| JP | 2019-140039 A | 8/2019 |
| JP | 2019-192470 A | 10/2019 |
| WO | 03/081698 A1 | 10/2003 |
| WO | 2019/187128 A1 | 10/2019 |

OTHER PUBLICATIONS

Japanese Office Action issued on Apr. 4, 2023 for Japanese Patent Application No. 2021-556156.
Chinese Office Action issued on Jan. 17, 2024 for Chinese Patent Application No. 202080064687.9.
Japanese Office Action issued on Sep. 5, 2023 for Japanese Patent Application No. 2021-556156.

\* cited by examiner

POSITIVE ELECTRODE FOR LITHIUM ION SECONDARY BATTERIES, AND LITHIUM ION SECONDARY BATTERY

TECHNICAL FIELD

The present invention relates to a positive electrode for lithium ion secondary batteries, and a lithium ion secondary battery including the same.

BACKGROUND ART

In the automotive industry, fuel consumption regulations and environmental regulations have been strengthened. To comply with such regulations, the development of techniques for electric vehicles, which include a battery as a power source and have no carbon dioxide emissions, and fuel cell vehicles, which include hydrogen as a fuel source, have attracted attention. However, electric vehicles and fuel cell vehicles have a variety of problems such as insufficient infrastructure development. Therefore, PHEVs (Plug-in Hybrid Electric Vehicles) and HEVs (Hybrid Electric Vehicles), which include both an internal combustion engine and a battery as power sources and have a low level of carbon dioxide emissions, are the potential candidates to meet the fuel consumption regulations and environmental regulations.

A lithium ion secondary battery used for a PHEV or a HEV is required to have a long life. Patent Literature 1 discloses a lithium battery including a positive electrode that is obtained by stacking a plurality of layers of a positive-electrode material represented by $Li_XCo_{1-Y}Ni_YO_Z$ wherein $0<X\leq1.3$, $0\leq Y\leq1$, and $1.8\leq Z\leq2.2$ on a positive-electrode current collector. In Patent Literature 1, the atomic ratio of Co in the layer of the positive-electrode material at a position away from the positive-electrode current collector is set higher than that in the layer of the positive-electrode material at a position closer to the positive-electrode current collector so that a decrease in discharge capacity due to charging and discharging is suppressed.

CITATION LIST

Patent Literature

Patent Literature 1: JP H10-255762 A

SUMMARY OF INVENTION

Technical Problem

In order for a lithium ion secondary battery to have a long life, it is necessary to not only suppress a decrease in discharge capacity but also suppress an increase in internal resistance due to charging and discharging.

Accordingly, it is an object of the present invention to provide a positive electrode for a lithium ion secondary battery that can suppress both a decrease in the discharge capacity and an increase in the internal resistance of the lithium ion battery due to charging and discharging.

Solution to Problem

According to an aspect of the present invention, there is provided a positive electrode for a lithium ion secondary battery that includes
a positive-electrode current collector; and
a layered structure provided on the positive-electrode current collector,
in which
the layered structure includes an outermost layer most distant from the positive-electrode current collector, and an innermost layer closest to the positive-electrode current collector,
the outermost layer contains a first positive-electrode active material represented by the following Formula (1):

$$Li_{1+X}M^AO_2 \qquad (1)$$

wherein X satisfies $-0.15\leq X\leq0.15$,
$M^A$ represents an element group including Ni, Co, and Mn, and
provided that proportions of Ni, Co, and Mn in all elements of $M^A$ are respectively represented by a (mol %), b (mol %), and c (mol %), a, b, and c satisfy $0<a/(b+c)<1$ and $1\leq b/c\leq2$, and the innermost layer contains a second positive-electrode active material represented by the following Formula (2):

$$Li_{1+Y}M^BO_2 \qquad (2)$$

wherein Y satisfies $-0.15\leq Y\leq0.15$, and
$M^B$ represents an element group including Ni, Co, and at least one of Mn or Al.

According to another aspect of the present invention, there is provided a lithium ion secondary battery including the positive electrode for the lithium ion secondary battery according to the aforementioned aspect.

The present specification incorporates the disclosure of JP Patent Application No. 2019-207241 that serves as a basis for priority claim of the present application.

Advantageous Effects of Invention

The present invention provides a positive electrode for a lithium ion secondary battery that can suppress both a decrease in the discharge capacity and an increase in the internal resistance of the lithium ion battery due to charging and discharging.

Figure 1:
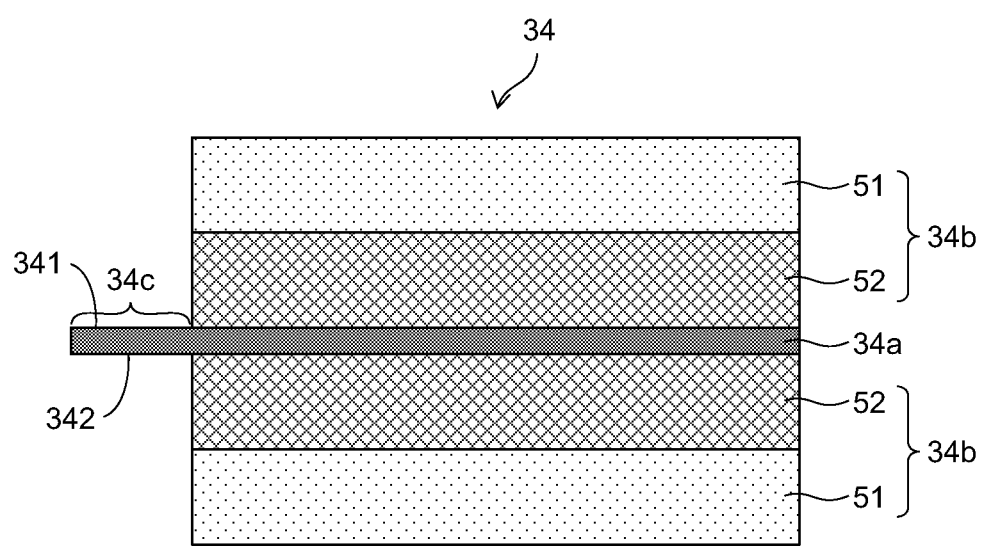
FIG. 1 is a schematic cross-sectional view of a positive electrode for a lithium ion secondary battery according to a first embodiment.

DESCRIPTION OF EMBODIMENTS (1) Positive Electrode for Lithium Ion Secondary Battery First, a positive electrode 34 for a lithium ion secondary battery according to a first embodiment illustrated in FIG. 1 will be described. The positive electrode 34 for the lithium ion secondary battery according to the first embodiment includes a positive-electrode current collector 34a and layered structures 34b provided on the positive-electrode current collector 34a.

The positive-electrode current collector 34a is formed from any material that has high electrical conductivity and is not alloyed with lithium ions. In FIG. 1, the positive-electrode current collector 34a has a plate-like (i.e., sheet-like) shape having a first face 341 and a second face 342 opposite to the first face 341, but the shape of the positive-electrode current collector 34a is not limited thereto. For the positive-electrode current collector 34a, aluminum foil can be used, for example.

The layered structures 34b are respectively provided on the first face 341 and the second face 342 of the positive-electrode current collector 34a. As illustrated in FIG. 1, one end of the positive-electrode current collector 34a has a portion not provided with the layered structures 34b (hereinafter referred to as an "exposed positive-electrode current collector portion") 34c.

Hereinafter, the layered structure 34b provided on the first face 341 of the positive-electrode current collector 34a will be described. The following description also holds true for the layered structure 34b provided on the second face 342 of the positive-electrode current collector 34a. Thus, the description of the layered structure 34b provided on the second face 342 of the positive-electrode current collector 34a is omitted herein.

In the first embodiment, the layered structure 34b consists of two layers stacked in a direction perpendicular to the first face 341 of the positive-electrode current collector 34a. Among the two layers, a layer formed directly on the first face 341 of the positive-electrode current collector 34a shall be referred to as an innermost layer 52, and a layer formed on the innermost layer 52 shall be referred to as an outermost layer 51.

The outermost layer 51 contains a first positive-electrode active material represented by the following Formula (1):

$$Li_{1+X}M^AO_2 \qquad (1)$$

wherein X satisfies −0.15≤X≤0.15, $M^A$ represents an element group including Ni, Co, and Mn, and provided that the proportions of Ni, Co, and Mn in all elements of $M^A$ are respectively represented by a (mol %), b (mol %), and c (mol %), a, b, and c satisfy 0<a/(b+c)<1 and 1≤b/c≤2.

X satisfying −0.15≤X≤0.15 allows the first positive-electrode active material to have high true density and high reversibility.

$M^A$ including Mn in addition to Ni and Co allows the first positive-electrode active material to have high thermal stability and high stability in a high potential state. Therefore, a lithium ion secondary battery that includes the positive electrode 34 for the lithium ion secondary battery according to the first embodiment is highly safe.

As described in Examples later, as the first positive-electrode active material has a composition that satisfies 0<a/(b+c)<1 and 1≤b/c, it is possible to suppress a decrease in the discharge capacity and an increase in the direct current (DC) internal resistance of the lithium ion secondary battery due to charging and discharging. The inventors consider its reason as follows. The first positive-electrode active material that satisfies 0<a/(b+c)<1 and 1≤b/c allows charge-discharge reactions to proceed smoothly. Charge-discharge reactions preferentially occur on a surface (i.e., an outer surface) of the layered structure 34b that is most distant from the positive-electrode current collector 34a. Therefore, as the outermost layer 51 that is most distant from the positive-electrode current collector 34a contains the first positive-electrode active material with the aforementioned composition, it is possible to allow charge-discharge reactions to proceed smoothly and more effectively. Consequently, the discharge capacity and the DC internal resistance of the lithium ion secondary battery can be maintained over many charge-discharge cycles.

As the first positive-electrode active material has a composition that satisfies b/c≤2, the cost of the positive electrode for the lithium ion secondary battery is reduced, and the safety of the lithium ion secondary battery improves.

$M^A$ may further include at least one of Zr, Ti, Cr, Fe, Cu, Zn, Ge, Sn, Mg, Ag, Ta, Nb, B, P, Ca, Sr, or Ba. When $M^A$ includes Zr, the internal resistance of the lithium ion secondary battery at low temperatures decreases. The content of Zr relative to the total amount of Ni, Co, and Mn may be 0.1 to 2.0 mol %, in particular, 0.2 to 1.0 mol %. In addition, the proportion of an element(s) other than Ni, Co, and Mn in all elements of $M^A$ may be less than or equal to 10 mol %, in particular, less than or equal to 3 mol %. This allows sufficient suppression of a decrease in the discharge capacity and an increase in the DC internal resistance of the lithium ion secondary battery due to charging and discharging.

The outermost layer 51 may further contain a binder and a conductive material.

As the binder, it is possible to use, for example, polyvinylidene difluoride (PVdF), polytetrafluoroethylene (PTFE), polyethylene, polystyrene, polybutadiene, polyacrylonitrile, polyvinyl fluoride, polypropylene fluoride, polychloroprene fluoride, butyl rubber, nitrile rubber, styrene butadiene rubber, polysulfide rubber, nitrocellulose, cyanoethyl cellulose, a variety of latexes, acrylic resin, or a mixture thereof.

As the conductive material, it is possible to use a carbonaceous material. The carbonaceous material may be crystalline carbon, amorphous carbon, or a mixture thereof. Examples of crystalline carbon include artificial graphite, natural graphite (e.g., flake graphite), and a mixture thereof. Examples of amorphous carbon include carbon black (e.g., acetylene black, Ketjenblack, channel black, furnace black, lamp black, thermal black, or a mixture thereof).

The outermost layer 51 may have a thickness of 5 μm to 50 μm. This allows sufficient suppression of a decrease in the discharge capacity and an increase in the DC internal resistance of the lithium ion secondary battery due to charging and discharging.

The innermost layer 52 may contain a second positive-electrode active material represented by the following Formula (2):

$$Li_{1+Y}M^BO_2 \qquad (2)$$

wherein Y satisfies −0.15≤Y≤0.15, and $M^B$ represents an element group including Ni, Co, and at least one of Mn or Al.

Y satisfying −0.15≤Y≤0.15 allows the second positive-electrode active material to have high true density and high reversibility.

$M^B$ including at least one of Mn or Al in addition to Ni and Co allows the second positive-electrode active material to have high thermal stability and high stability in a high potential state. Therefore, a lithium ion secondary battery that includes the positive electrode 34 for the lithium ion secondary battery according to the first embodiment is highly safe.

Provided that the proportions of Ni, Co, Mn, and Al in all elements of $M^B$ are respectively represented by d (mol %), e (mol %), f (mol %), and g (mol %), d, e, f, and g satisfy $0<d$, $0<e$, $0≤f$, $0≤g$, and $0<f+g$. Further, d, e, f, and g may satisfy $1≤d/(e+f+g)≤4$. As the innermost layer 52 that is most distant from the outer surface of the layered structure 34b contains the second positive-electrode active material that satisfies $1≤d/(e+f+g)≤4$, it is possible to further suppress a decrease in the discharge capacity and an increase in the DC internal resistance of the lithium ion secondary battery due to charging and discharging.

$M^B$ may further include at least one of Zr, Ti, Cr, Fe, Cu, Zn, Ge, Sn, Mg, Ag, Ta, Nb, B, P, Ca, Sr, or Ba. When $M^B$ includes Zr, the internal resistance of the lithium ion secondary battery at low temperatures decreases. The content of Zr relative to the total amount of Ni, Co, Mn, and Al may be 0.1 to 2.0 mol %, in particular, 0.2 to 1.0 mol %. In addition, the proportion of an element(s) other than Ni, Co, Mn, and Al in all elements of $M^B$ may be less than or equal to 10 mol %, in particular, less than or equal to 3 mol %. This allows sufficient increase of the discharge capacity of the lithium ion secondary battery.

The innermost layer 52 may further contain a binder and a conductive material as with the outermost layer 51.

The layered structure 34b in the first embodiment may be formed as follows, for example. The first positive-electrode active material, a conductive material, and a binder are dispersed in a solvent (e.g., N-Methyl-2-pyrrolidone (NMP) and water) to prepare a paste-like or slurry-like first composition. Similarly, a paste-like or slurry-like second composition is prepared from the second positive-electrode active material, a conductive material, and a binder. The second composition is applied to the first face 341 of the positive-electrode current collector 34a and is dried, and is then subjected to calender treatment as appropriate so that the innermost layer 52 is formed. Next, the first composition is applied onto the innermost layer 52 and is dried, and is then subjected to calender treatment as appropriate so that the outermost layer 51 is formed. Accordingly, the layered structure 34b is formed. Instead of sequentially applying and drying the second composition and the first composition, it is also possible to concurrently apply the first composition and the second composition using slot-die coating, for example, and dry them so as to form the outermost layer 51 and the innermost layer 52.

The amount of each of the elements in the first positive-electrode active material and the second positive-electrode active material can be measured with the ICP (Inductive Coupled Plasma) method.

Figure 2:
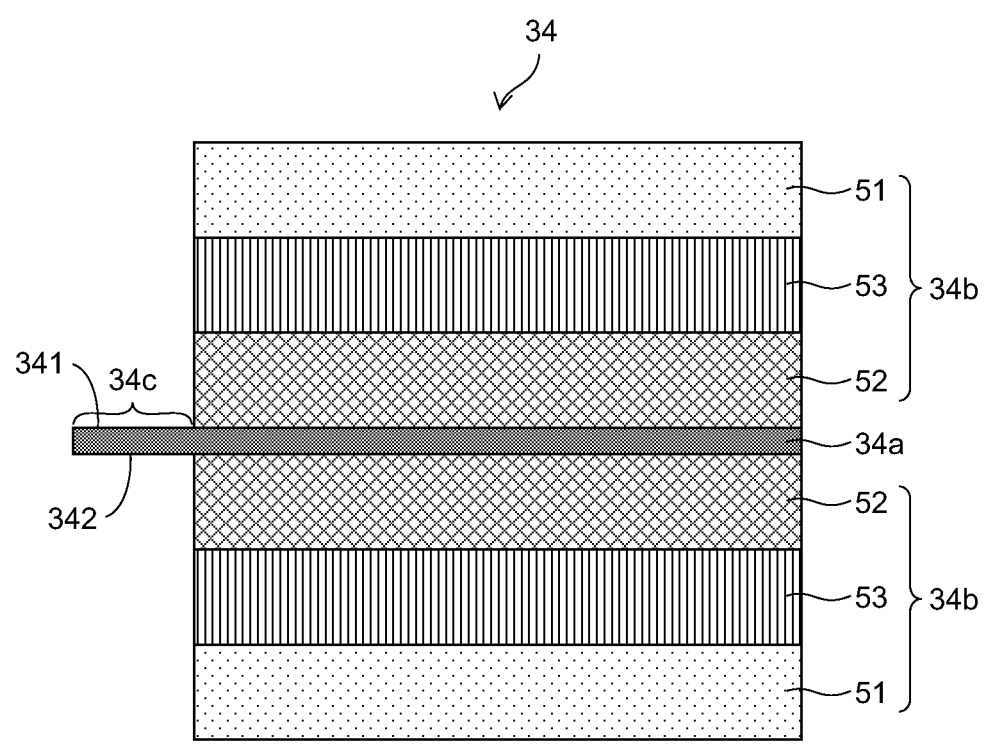
FIG. 2 is a schematic cross-sectional view of a positive electrode for a lithium ion secondary battery according to a second embodiment.

Next, the positive electrode 34 for the lithium ion secondary battery according to a second embodiment illustrated in FIG. 2 will be described. The positive electrode 34 for the lithium ion secondary battery according to the second embodiment includes the positive-electrode current collector 34a and the layered structures 34b formed on the positive-electrode current collector 34a.

The positive-electrode current collector 34a in the positive electrode 34 for the lithium ion secondary battery according to the second embodiment is similar to the positive-electrode current collector 34a in the positive electrode 34 for the lithium ion secondary battery according to the first embodiment. Thus, the description thereof is omitted herein.

The layered structure 34b is provided on each of the first face 341 and the second face 342 of the positive-electrode current collector 34a. The positive-electrode current collector 34a has the exposed positive-electrode current collector portion 34c not provided with the layered structures 34b.

Hereinafter, the layered structure 34b provided on the first face 341 of the positive-electrode current collector 34a will be described. The following description also holds true for the layered structure 34b provided on the second face 342 of the positive-electrode current collector 34a. Thus, the description of the layered structure 34b provided on the second face 342 of the positive-electrode current collector 34a is omitted herein.

In the second embodiment, the layered structure 34b consists of three layers stacked in a direction perpendicular to the first face 341 of the positive-electrode current collector 34a. Among the three layers, a layer formed directly on the first face 341 of the positive-electrode current collector 34a shall be referred to as the innermost layer 52, a layer formed on the innermost layer 52 shall be referred to as an intermediate layer 53, and a layer formed on the intermediate layer 53 shall be referred to as the outermost layer 51.

The outermost layer 51 and the innermost layer 52 in the second embodiment are respectively similar to the outermost layer 51 and the innermost layer 52 in the first embodiment. Thus, the description thereof is omitted herein.

The intermediate layer 53 may contain a third positive-electrode active material represented by the following Formula (3):

$$Li_{1+Z}M^CO_2 \qquad (3)$$

wherein Z satisfies $-0.15≤Z≤0.15$, and $M^C$ represents an element group including Ni, Co, and at least one of Mn or Al.

Z satisfying $-0.15≤Z≤0.15$ allows the third positive-electrode active material to have high true density and high reversibility.

$M^C$ including at least one of Mn or Al in addition to Ni and Co allows the third positive-electrode active material to have high thermal stability and high stability in a high potential state. Therefore, a lithium ion secondary battery that includes the positive electrode 34 for the lithium ion secondary battery according to the second embodiment is highly safe.

The amount of each element in the intermediate layer 53 can be measured with the ICP method.

The intermediate layer 53 may further contain a binder and a conductive material as with the outermost layer 51 and the innermost layer 52.

The proportion by weight of the conductive material in the intermediate layer 53 may be higher than the proportion by weight of the conductive material in each of the outermost layer 51 and the innermost layer 52, and the proportion by weight of the binder in the intermediate layer 53 may be lower than the proportion by weight of the binder in each of the outermost layer 51 and the innermost layer 52, and further, the proportion by weight of the third positive-electrode active material in the intermediate layer 53 may be lower than the proportion by weight of the first positive-electrode active material in the outermost layer and the proportion by weight of the second positive-electrode active material in the innermost layer. This allows improvement of the electronic conductivity of the layered structure 34b. In addition, the intermediate layer 53 that contains a high proportion by weight of a conductive material can retain a greater amount of an electrolytic solution than the outermost layer 51 and the innermost layer 52, and thus can supply the electrolytic solution to the outermost layer 51 and the innermost layer 52 while the lithium ion secondary battery is discharged. This can improve the ionic conductivity of the layered structure 34b. It should be noted that in such a case, the intermediate layer 53 may be thinner than the outermost layer 51 and the innermost layer 52.

The layered structure 34b in the second embodiment can be formed as follows, for example. The first positive-electrode active material, a conductive material, and a binder are dispersed in a solvent to prepare a paste-like or slurry-like first composition. Similarly, a paste-like or slurry-like second composition is prepared from the second positive-electrode active material, a conductive material, and a binder, and also, a paste-like or slurry-like third composition is prepared from the third positive-electrode active material, a conductive material, and a binder. The second composition is applied to the first face 341 of the positive-electrode current collector 34a and is dried, and is then subjected to calender treatment as appropriate so that the innermost layer 52 is formed. Next, the third composition is applied onto the innermost layer 52 and is dried, and is then subjected to calender treatment as appropriate so that the intermediate layer 53 is formed. Further, the first composition is applied onto the intermediate layer 53 and is dried, and is then subjected to calender treatment as appropriate so that the outermost layer 51 is formed. Accordingly, the layered structure 34b is formed. Instead of sequentially applying and drying the second composition, the third composition, and the first composition, it is also possible to concurrently apply the first composition, the second composition, and the third composition using slot-die coating, for example, and dry them so as to form the outermost layer 51, the innermost layer 52, and the intermediate layer 53.

In each of the first embodiment and the second embodiment, the layered structure 34b is provided on each of the first face 341 and the second face 342 of the positive-electrode current collector 34a, but the layered structure 34b may be provided on only one of the first face 341 and the second face 342 of the positive-electrode current collector 34a. That is, the layered structure 34b is provided on at least one of the first face 341 or the second face 342 of the positive-electrode current collector 34a.

In the first embodiment and the second embodiment, each layered structure 34b consists of two or three layers, but each layered structure 34b may consists of four or more layers. That is, the layered structure 34b includes at least the outermost layer 51, which is a layer most distant from the first face 341 of the positive-electrode current collector 34a, in the layered structure 34b, and the innermost layer 52, which is a layer closest to the first face 341 of the positive-electrode current collector 34a, in the layered structure 34b, and may further include at least one intermediate layer 53 between the outermost layer 51 and the innermost layer 52.

(2) Lithium Ion Secondary Battery

The positive electrode for the lithium ion secondary battery according to each of the aforementioned embodiments is applicable to any lithium ion secondary battery. Hereinafter, an example of a lithium ion secondary battery will be described that includes the positive electrode for the lithium ion secondary battery according to each of the aforementioned embodiments.

Figure 3:
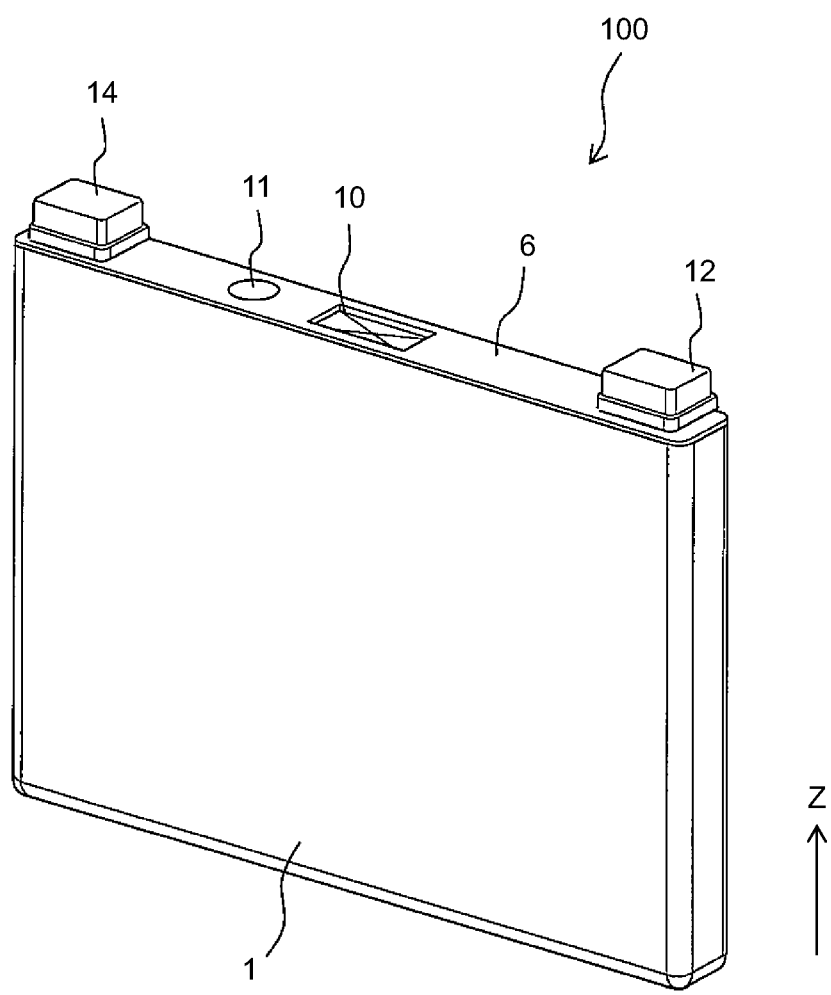
FIG. 3 is a perspective external view of a lithium ion secondary battery.
Figure 4:
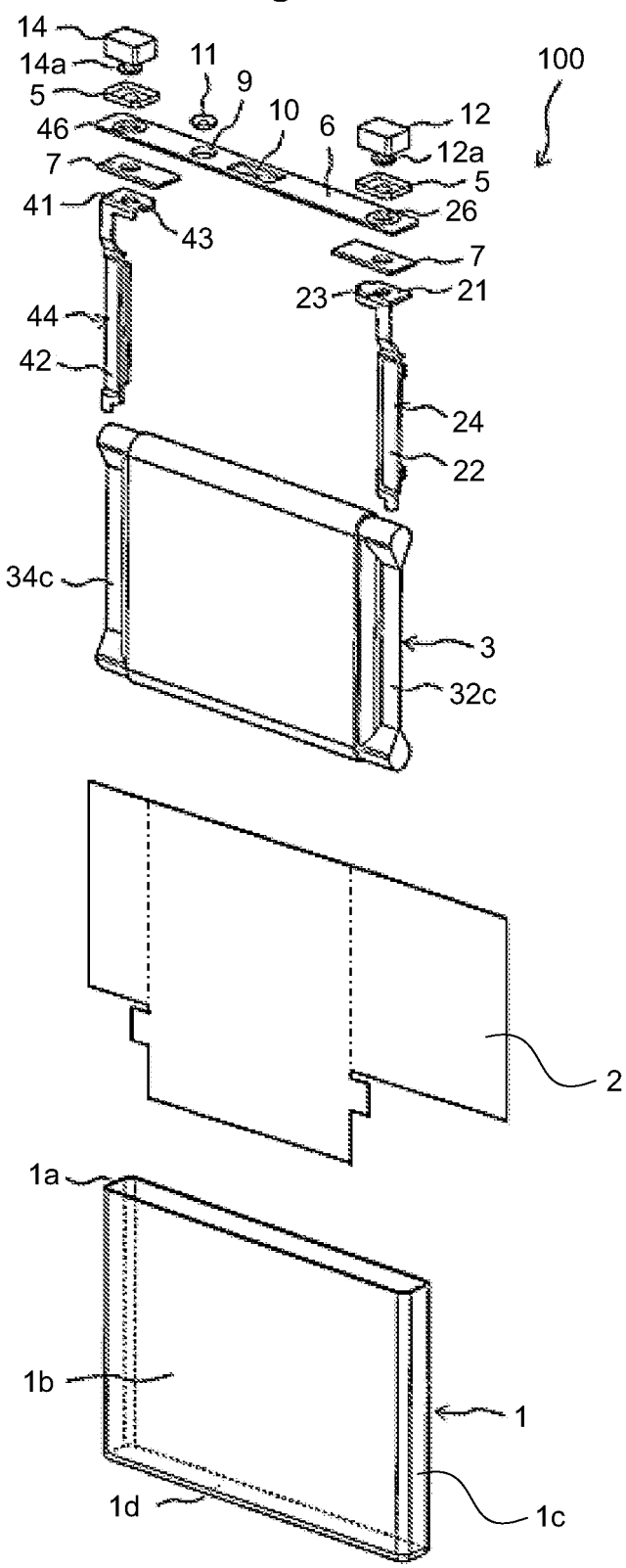
FIG. 4 is an exploded perspective view of a lithium ion secondary battery.

A lithium ion secondary battery 100 illustrated in FIGS. 3 and 4 is a rectangular prism battery. The lithium ion secondary battery 100 includes a battery can 1 and a battery lid 6. The battery can 1 includes a rectangular bottom face 1d, side faces, which include a pair of opposite wide side faces 1b each extending in an upright position from the bottom face 1d and having a relatively large area and a pair of opposite narrow side faces 1c each extending in an upright position from the bottom face 1d and having a relatively small area, and an opening 1a facing upward at the upper ends of the wide side faces 1b and the narrow side faces 1c. It should be noted that the term "upward" herein means the Z-direction in FIGS. 3 and 4.

The opening 1a of the battery can 1 is sealed with the battery lid 6. The battery lid 6 has an approximately rectangular plate-like shape, and is welded to close the opening 1a of the battery can 1, thereby sealing the battery can 1.

The battery lid 6 is integrally provided with a gas exhaust valve 10. When pressure in the battery can 1 has increased, the gas exhaust valve 10 ruptures and a gas in the battery can 1 is discharged so that the pressure in the battery can 1 decreases. This ensures the safety of the lithium ion secondary battery 100.

The battery lid 6 has drilled therein a liquid inlet 9 for pouring an electrolytic solution into the battery can 1. The liquid inlet 9 is sealed with a liquid inlet plug 11 after an electrolytic solution has been poured into the battery can 1. The liquid inlet plug 11 is joined to the battery lid 6 by laser welding so as to seal the liquid inlet 9 and thus hermetically seal the lithium ion secondary battery 100.

The battery lid 6 has further drilled therein a positive-electrode-side through-hole 46 and a negative-electrode-side through-hole 26.

A positive-electrode external terminal 14 and a negative-electrode external terminal 12 are provided above the battery lid 6. A positive-electrode current collector 44 and a negative-electrode current collector 24 are provided below the battery lid 6 and in the battery can 1.

Examples of materials for forming the positive-electrode external terminal 14 and the positive-electrode current collector 44 include aluminum alloy, and examples of materials for forming the negative-electrode external terminal 12 and the negative-electrode current collector 24 include copper alloy.

Each of the positive-electrode external terminal 14 and the negative-electrode external terminal 12 has a welding joint portion to be joined to a bus bar or the like by welding. The welding joint portion has a shape of a rectangular parallelepiped block protruding upward from the battery lid 6. The lower face of the welding joint portion is opposite the surface of the battery lid 6, and the upper face of the welding joint portion is located at a predetermined level and is substantially parallel with the battery lid 6.

The positive-electrode current collector 44 includes a positive-electrode current-collector proximal portion 41 in a rectangular plate-like shape that is opposite the lower face of the battery lid 6, and a positive-electrode-side connection terminal portion 42 extending from a side edge of the positive-electrode current-collector proximal portion 41 toward the bottom face 1d side along the wide side faces 1b of the battery can 1. Similarly, the negative-electrode current collector 24 includes a negative-electrode current-collector proximal portion 21 in a rectangular plate-like shape that is opposite the lower face of the battery lid 6, and a negative-electrode-side connection terminal portion 22 extending from a side edge of the negative-electrode current-collector proximal portion 21 toward the bottom face 1d side along the wide side faces 1b of the battery can 1. The positive-electrode current-collector proximal portion 41 and the negative-electrode current-collector proximal portion 21 respectively have formed therein a positive-electrode-side open hole 43 and a negative-electrode-side open hole 23.

A positive-electrode connection portion 14a and a negative-electrode connection portion 12a are provided such that they protrude from the respective lower faces of the positive-electrode external terminal 14 and the negative-electrode external terminal 12. The positive-electrode connection portion 14a and the negative-electrode connection portion 12a are respectively formed integrally with the positive-electrode external terminal 14 and the negative-electrode external terminal 12.

The positive-electrode connection portion 14a has a cylindrical shape so that it can be inserted through the positive-electrode-side through-hole 46 of the battery lid 6 and through the positive-electrode-side open hole 43 of the positive-electrode current-collector proximal portion 41. Similarly, the negative-electrode connection portion 12a has a cylindrical shape so that it can be inserted through the negative-electrode-side through-hole 26 of the battery lid 6 and through the negative-electrode-side open hole 23 of the negative-electrode current-collector proximal portion 21. The positive-electrode connection portion 14a is arranged such that it passes through the positive-electrode-side through-hole 46 of the battery lid 6 and through the positive-electrode-side open hole 43 of the positive-electrode current-collector proximal portion 41, and thus penetrates through the battery lid 6 and the positive-electrode current-collector proximal portion 41. A tip end of the positive-electrode connection portion 14a is swaged to integrally fix the positive-electrode external terminal 14 and the positive-electrode current collector 44 to the battery lid 6. Similarly, the negative-electrode connection portion 12a is arranged such that it passes through the negative-electrode-side through-hole 26 of the battery lid 6 and through the negative-electrode-side open hole 23 of the negative-electrode current-collector proximal portion 21, and thus penetrates through the battery lid 6 and the negative-electrode current-collector proximal portion 21. A tip end of the negative-electrode connection portion 12a is swaged to integrally fix the negative-electrode external terminal 12 and the negative-electrode current collector 24 to the battery lid 6.

The positive-electrode external terminal 14 is electrically connected to a wound group 3 described below via the positive-electrode connection portion 14a and the positive-electrode current collector 44. Similarly, the negative-electrode external terminal 12 is electrically connected to the wound group 3 via the negative-electrode connection portion 12a and the negative-electrode current collector 24. When the lithium ion secondary battery 100 is charged, power is supplied to the wound group 3 from an external power supply via the positive-electrode external terminal 14, the positive-electrode connection portion 14a, and the positive-electrode current collector 44, and also via the negative-electrode external terminal 12, the negative-electrode connection portion 12a, and the negative-electrode current collector 24. When the lithium ion secondary battery 100 is discharged, power is supplied to an external load from the wound group 3 via the positive-electrode external terminal 14, the positive-electrode connection portion 14a, and the positive-electrode current collector 44, and also via the negative-electrode external terminal 12, the negative-electrode connection portion 12a, and the negative-electrode current collector 24.

To electrically insulate each of the positive-electrode current collector 44, the negative-electrode current collector 24, the positive-electrode external terminal 14, and the negative-electrode external terminal 12 from the battery lid 6, a gasket 5 is provided between each of the positive-electrode external terminal 14 and the negative-electrode external terminal 12 and the battery lid 6, and also, an insulating plate 7 is provided between each of the positive-electrode current collector 44 and the negative-electrode current collector 24 and the battery lid 6. Examples of materials for forming the insulating plate 7 and the gasket 5 include insulating resin materials, such as polybutylene terephthalate, polyphenylene sulfide, and perfluoroalkoxy fluorocarbon resin.

The battery can 1 houses an electrolytic solution, the wound group 3, and an insulating protective film 2.

The electrolytic solution is poured into the battery can 1 through the liquid inlet 9. As the electrolytic solution, it is possible to use a nonaqueous electrolytic solution obtained by dissolving lithium salts, such as lithium hexafluorophosphate ($LiPF_6$) in a carbonic ester-based organic solvent, such as ethylene carbonate, for example.

Figure 5:
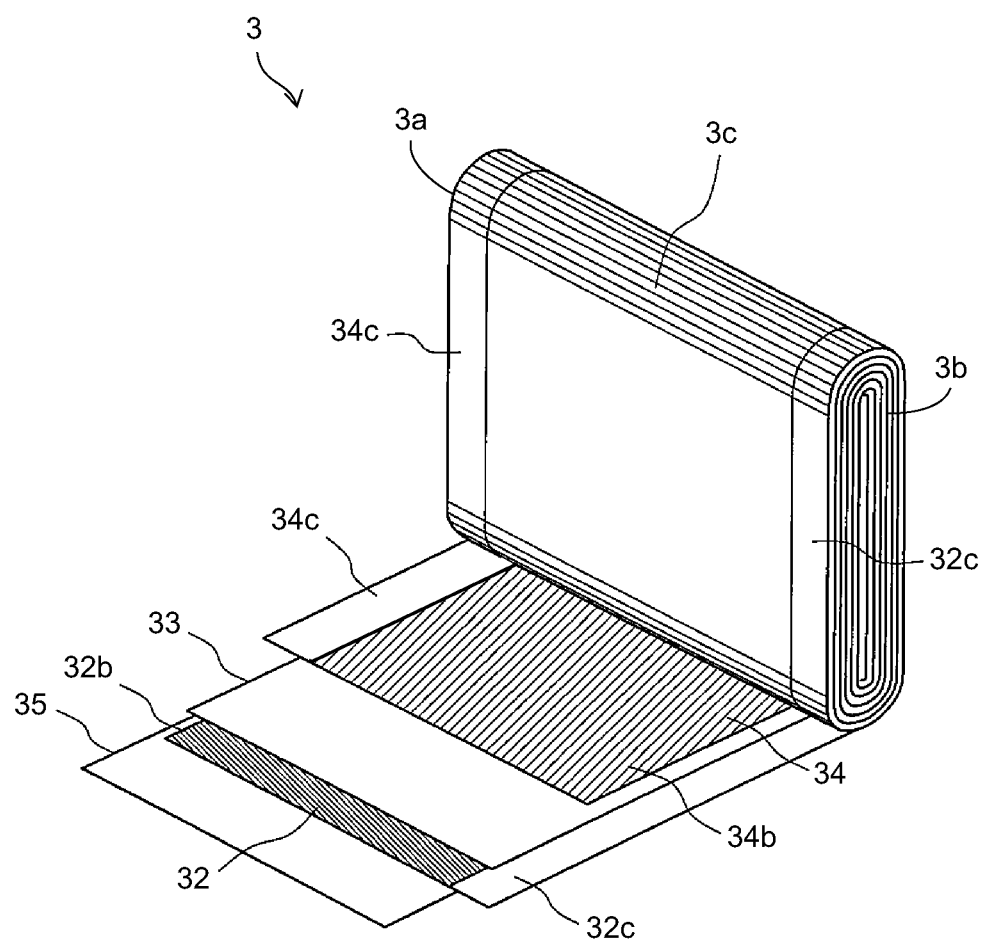
FIG. 5 is a partially developed perspective view of a wound group.

As illustrated in FIG. 5, the wound group 3 includes a negative electrode 32, a positive electrode 34, and two separators 33 and 35. The separator 35, the negative electrode 32, the separator 33, and the positive electrode 34 are stacked in this order and are wound in a flat shape. The separator 35 is located on the outermost periphery of the wound group 3, and the negative electrode 32 is located on the inner side of the separator 35. The two separators 33 and 35 electrically insulate the positive electrode 34 and the negative electrode 32.

The wound group 3 has a pair of opposite end faces 3a and 3b that are perpendicular to the winding axis, and a side face 3c between the pair of end faces. The side face 3c includes a pair of opposite curved portions each having a semi-circular cross section, and planar portions formed between and continuously with the pair of curved portions. The wound group 3 is arranged in the battery can 1 so that that the planar portions of the side face 3c are substantially parallel with the wide side faces 1b of the battery can 1.

The positive electrode for the lithium ion secondary battery according to each of the aforementioned embodiments is used as the positive electrode 34. The exposed positive-electrode current collector portion 34c of the positive-electrode current collector 34a (see FIGS. 1 and 2) is provided around the end face 3a of the wound group 3 and its vicinity. The exposed positive-electrode current collector portion 34c is opposite the positive-electrode-side connection terminal portion 42 of the positive-electrode current collector 44 and is electrically connected thereto.

The negative electrode 32 includes a negative-electrode current collector and negative-electrode mixture layers 32b formed on the opposite faces of the negative-electrode current collector.

The negative-electrode current collector is formed from a given material that has high electrical conductivity and is not alloyed with lithium ions. One end of the negative-electrode current collector has a portion (hereinafter referred to as an "exposed negative-electrode current collector portion") 32c not covered with the negative-electrode mixture layers 32b. The exposed negative-electrode current collector portion 32c is provided around the end face 3b of the wound group 3 and its vicinity. The exposed negative-electrode current collector portion 32c is opposite the negative-electrode-side connection terminal portion 22 of the negative-electrode current collector 24 and is electrically connected thereto.

Each negative-electrode mixture layer 32b contains a negative-electrode active material. The negative-electrode active material is formed from a given material capable of inserting and extracting lithium ions. Examples of such a material include a carbon material, such as natural graphite, artificial graphite, non-graphitizable carbon (i.e., hard carbon), or graphitizable carbon (i.e., soft carbon); graphite coated with amorphous carbon; a mixture of carbon black as a conductive auxiliary material (e.g., acetylene black, Ketjenblack, channel black, furnace black, lamp black, or thermal black) and graphite; a composite obtained by coating such a mixture with amorphous carbon; a mixture of graphite and non-graphitizable carbon, graphitizable carbon, or metal oxide (e.g., iron oxide or copper oxide); and a mixture thereof.

Each negative-electrode mixture layer 32b further contains a binder. As the binder, it is possible to use a material similar to that of the binder used for the layered structures 34b of the positive electrode 34 exemplarily described above. Each negative-electrode mixture layer 32b further contains a thickener. As the thickener, carboxymethylcellulose can be used.

The entire thickness of the negative-electrode mixture layers 32b (that is, the total thickness of the two negative-electrode mixture layers 32b formed on the opposite faces of the negative-electrode current collector) is not limited to a particular value, but is usually 50 μm to 200 μm.

Each of the separators 33 and 35 has a function of preventing short between the positive electrode 34 and the negative electrode 32, and a function of retaining a non-aqueous electrolytic solution. As each of the separators 33 and 35, it is possible to use a porous sheet made of resin, such as polyethylene (PE), polypropylene (PP), polyester, cellulose, or polyamide, or a sheet obtained by stacking such materials (e.g., a three-layer sheet of PP/PE/PP), for example.

One or both of the opposite faces of each of the separators 33 and 35 may be provided with a layer containing an inorganic material (e.g., alumina particles) and a binder. This allows the separators 33 and 35 to be prevented from melting, and thus, their insulating function to be maintained even when the lithium ion secondary battery 100 is used in an abnormal state (e.g., when the temperature of the lithium ion secondary battery has increased to 160° C. or more due to overcharge or crushing), thereby improving the safety of the lithium ion secondary battery 100.

It is also possible to arrange an axis core on the innermost periphery of the wound group 3 as appropriate. As the axis core, it is possible to use a wound resin sheet with flexural rigidity higher than those of the positive-electrode current collector, the negative-electrode current collector, and the separators 33 and 35.

The insulating protective film 2 is wound around the wound group 3. As the insulating protective film 2, a sheet made of synthetic resin, such as polypropylene (PP), can be used, for example. The insulating protective film 2 may be either a single sheet or a sheet obtained by stacking a plurality of sheets. The winding axis of the insulating protective film 2 is perpendicular to the winding axis of the wound group 3 and is parallel with the planar portions of the side face 3c of the wound group 3.

Although the embodiments of the present invention have been described in detail above, the present invention is not limited thereto, and various design changes are possible within the spirit of the present invention recited in the claims.

EXAMPLES

Hereinafter, the present invention will be specifically described by way of Examples, but the present invention is not limited thereto.

Examples 1 to 11

$Li_{1.0}Ni_aCo_bMn_cO_2$ powder was prepared as the first positive-electrode active material, and $Li_{1.0}Ni_dCo_eMn_fAl_gO_2$ powder was prepared as the second positive-electrode active material. The values of a to g in each Example were determined through ICP analysis. Table 1 illustrates the results. In addition, acetylene black was prepared as a conductive material, and polyvinylidene difluoride (PVdF) was prepared as a binder.

The first positive-electrode active material, the conductive material, and the binder were mixed at a weight ratio of 90:5:5. Then, N-Methyl-2-pyrrolidone (NMP) was added to the obtained mixture to adjust viscosity so that a first slurry was obtained. Similarly, the second positive-electrode active material, the conductive material, and the binder were mixed at a weight ratio of 90:5:5. Then, N-Methyl-2-pyrrolidone (NMP) was added to the obtained mixture to adjust viscosity so that a second slurry was obtained.

Aluminum foil with a thickness of 15 μm was prepared as a positive-electrode current collector. Then, the first slurry and the second slurry were applied to each of the opposite faces of the positive-electrode current collector through slot-die coating so that a layer of the second slurry was formed on each of the opposite faces of the positive-electrode current collector and a layer of the first slurry was formed on the layer of the second slurry. Next, the layer of the first slurry and the layer of the second slurry were dried and pressed. Accordingly, a positive electrode (i.e., a positive electrode for a lithium ion secondary battery) was obtained in which layered structures each including the outermost layer containing the first positive-electrode active material and the innermost layer containing the second positive-electrode active material are formed on the opposite faces of the positive-electrode current collector.

Natural graphite coated with amorphous carbon was prepared as a negative-electrode active material, styrene butadiene rubber (SBR) was prepared as a binder, and carboxymethylcellulose (CMC) was prepared as a dispersant. The negative-electrode active material, the binder, and the dispersant were mixed at a weight ratio of 98:1:1. Then, ion-exchanged water was added to the obtained mixture to adjust viscosity so that a negative electrode slurry was obtained. Copper foil with a thickness of 10 μm was prepared as a negative-electrode current collector. The negative electrode slurry was applied to the opposite faces of the negative-electrode current collector through slot-die coating so that negative-electrode mixture layers were formed. Then, the negative-electrode mixture layers were dried and pressed. Accordingly, a negative electrode was obtained.

A separator, the negative electrode, another separator, and the positive electrode were stacked in this order and were wound. Accordingly, a wound group such as the one illustrated in FIG. 5 was produced. In addition, ethylene carbonate (EC) and dimethyl carbonate (DMC) were mixed at a volume ratio of 1:2, and then, $LiPF_6$ was dissolved in the obtained mixed solution. Accordingly, 1.0 mol/L of a $LiPF_6$ solution was obtained as a nonaqueous electrolytic solution. With the wound group and the nonaqueous electrolytic solution, a lithium ion secondary battery such as the one illustrated in FIGS. 3 and 4 was produced.

Example 12

$Li_{1.0}Ni_aCo_bMn_cO_2$ powder was prepared as the first positive-electrode active material, and $Li_{1.0}Ni_dCo_eMn_fAl_gO_2$ powder was prepared as the second positive-electrode active material. Table 1 illustrates the values of a to g determined through ICP analysis. With the first positive-electrode active material and the second positive-electrode active material, a first slurry and a second slurry were produced as in Examples 1 to 11. In addition, $Li_{1.0}Ni_{0.6}Co_{0.2}Mn_{0.2}O_2$ powder was prepared as the third positive-electrode active material. The third positive-electrode active material, a conductive material, and a binder were mixed at a weight ratio of 90:5:5. Then, N-Methyl-2-pyrrolidone (NMP) was added to the obtained mixture to adjust viscosity so that a third slurry was obtained.

The first slurry, the second slurry, and the third slurry were applied to each of the opposite faces of the positive-electrode current collector through slot-die coating so that a layer of the second slurry was formed on each of the opposite faces of the positive-electrode current collector, a layer of the third slurry was formed on the layer of the second slurry, and a layer of the first slurry was formed on the layer of the third slurry. After that, drying and pressing were performed as in Examples 1 to 11. Accordingly, a positive electrode was obtained in which layered structures each including the outermost layer containing the first positive-electrode active material, the innermost layer containing the second positive-electrode active material, and the intermediate layer located between the outermost layer and the innermost layer and containing the third positive-electrode active material are formed on the opposite faces of the positive-electrode current collector.

With the obtained positive electrode, a lithium ion secondary battery was produced as in Examples 1 to 11.

Example 13

A lithium ion secondary battery was produced in a similar manner to Example 12 except that the third positive-electrode active material, the conductive material, and the binder were mixed at a weight ratio of 45:50:5.

Comparative Examples 1 to 3 and 6

$Li_{1.0}Ni_aCo_bMn_cO_2$ powder was prepared as the first positive-electrode active material, and $Li_{1.0}Ni_dCo_eMn_fAl_gO_2$ powder was prepared as the second positive-electrode active material. Table 1 illustrates the values of a to g determined through ICP analysis. With the first positive-electrode active material and the second positive-electrode active material, a lithium ion secondary battery was produced as in Examples 1 to 11.

Comparative Example 4

$Li_{1.0}Ni_{0.33}Co_{0.33}Mn_{0.33}O_2$ powder and $Li_{1.0}Ni_{0.5}Co_{0.2}Mn_{0.3}O_2$ powder were mixed at a weight ratio of 1:1. The composition of the obtained mixed powder was analyzed using the ICP method, and the molar ratio among Li, Ni, Co, and Mn was found to be 1.0:0.416:0.267:0.317. The mixed powder was used as the first positive-electrode active material and the second positive-electrode active material. In addition, acetylene black and graphite were used as a conductive material, and PVdF was used as a binder.

The mixed powder, acetylene black, graphite, and PVdF were mixed at a weight ratio of 90:4:3:3. Then, N-Methyl-2-pyrrolidone (NMP) was added to the obtained mixture to adjust viscosity so that a first slurry and a second slurry were produced.

With the obtained first slurry and second slurry, a lithium ion secondary battery was produced as in Examples 1 to 11. It should be noted that the values of a to g in Table 1 are the values obtained by analyzing the mixed powder using the ICP method as described above.

Comparative Example 5

A lithium ion secondary battery was produced in a similar manner to Examples 1 to 11 except that $Li_{1.0}Co_{1.0}O_2$ powder was used as the first positive-electrode active material and $Li_{1.0}Ni_{1.0}O_2$ powder was used as the second positive-electrode active material.

TABLE 1

| | Outermost Layer | | | Innermost Layer | | | | | | |
|---|---|---|---|---|---|---|---|---|---|---|
| | a | b | c | d | e | f | g | a/(b + c) | b/c | d/(e + f + g) |
| Example 1 | 0.33 | 0.33 | 0.33 | 0.6 | 0.2 | 0.2 | 0 | 0.5 | 1 | 1.5 |
| Example 2 | 0.4 | 0.35 | 0.25 | 0.6 | 0.2 | 0.2 | 0 | 0.67 | 1.4 | 1.5 |
| Example 3 | 0.35 | 0.4 | 0.25 | 0.6 | 0.2 | 0.2 | 0 | 0.54 | 1.6 | 1.5 |
| Example 4 | 0.3 | 0.45 | 0.25 | 0.6 | 0.2 | 0.2 | 0 | 0.43 | 1.8 | 1.5 |
| Example 5 | 0.25 | 0.5 | 0.25 | 0.6 | 0.2 | 0.2 | 0 | 0.33 | 2 | 1.5 |
| Example 6 | 0.42 | 0.29 | 0.29 | 0.5 | 0.3 | 0.2 | 0 | 0.72 | 1 | 1 |
| Example 7 | 0.33 | 0.33 | 0.33 | 0.5 | 0.3 | 0.2 | 0 | 0.5 | 1 | 1 |
| Example 8 | 0.33 | 0.33 | 0.33 | 0.5 | 0.2 | 0.3 | 0 | 0.5 | 1 | 1 |
| Example 9 | 0.33 | 0.33 | 0.33 | 0.8 | 0.1 | 0.1 | 0 | 0.5 | 1 | 4 |
| Example 10 | 0.33 | 0.33 | 0.33 | 0.85 | 0.075 | 0.075 | 0 | 0.5 | 1 | 5.67 |
| Example 11 | 0.33 | 0.33 | 0.33 | 0.8 | 0.15 | 0 | 0.05 | 0.5 | 1 | 4 |
| Example 12 | 0.33 | 0.33 | 0.33 | 0.8 | 0.1 | 0.1 | 0 | 0.5 | 1 | 4 |
| Example 13 | 0.33 | 0.33 | 0.33 | 0.6 | 0.2 | 0.2 | 0 | 0.5 | 1 | 1.5 |
| Comparative Example 1 | 0.5 | 0.2 | 0.3 | 0.33 | 0.33 | 0.33 | 0 | 1 | 0.67 | 0.5 |
| Comparative Example 2 | 0.55 | 0.25 | 0.2 | 0.33 | 0.33 | 0.33 | 0 | 1.22 | 1.25 | 0.5 |
| Comparative Example 3 | 0.65 | 0.2 | 0.15 | 0.33 | 0.33 | 0.33 | 0 | 1.86 | 1.33 | 0.5 |
| Comparative Example 4 | 0.416 | 0.267 | 0.317 | 0.416 | 0.267 | 0.317 | 0 | 0.71 | 0.84 | 0.71 |
| Comparative Example 5 | 0 | 1 | 0 | 1 | 0 | 0 | 0 | 0 | — | — |
| Comparative Example 6 | 0.5 | 0.2 | 0.3 | 0.6 | 0.2 | 0.2 | 0 | 1 | 0.67 | 1.5 |

(1) Measurement of Initial Battery Capacity

Each of the lithium ion secondary batteries produced in the aforementioned Examples and Comparative Examples was charged with a constant current of 1 CA until the battery voltage reached 4.2 V, and was then charged with a constant voltage of 4.2 V. The charging was conducted for a total of 2.5 hours. Then, after a break of 30 minutes, the lithium ion secondary battery was discharged with a constant current of 1 CA until the battery voltage reached 2.9 V, and discharge capacity was thus determined. The discharge capacity was determined as the initial battery capacity. Table 2 illustrates the initial battery capacity of each of the lithium ion secondary batteries of Examples and Comparative Examples normalized with the initial battery capacity of the lithium ion secondary battery of Example 1.

(2) Measurement of Initial DC Resistance (DCR)

Each lithium ion secondary battery was charged until the battery voltage reached 4.2 V. After that, the lithium ion secondary battery was discharged by a battery capacity of 5%. Then, after a break of 2 hours, the open-circuit voltage (OCV) of the lithium ion secondary battery was measured. Likewise, discharging of the lithium ion secondary battery by a battery capacity of 5% and the measurement of the OCV thereof were repeated to determine the relationship between the state of charge (SOC) and the OCV.

Based on the relationship between the SOC and the OCV, each lithium ion secondary battery was charged from a SOC of 0% to a SOC of 50% using the constant current-constant voltage (CC-CV) method. The charging current during constant-current charging was set to 1 CA. After that, the lithium ion battery was discharged with a constant current of 10 CA for 10 seconds, and the value of a voltage drop due to the discharging was measured. Further, constant-current discharging was performed in a similar manner with a discharging current of 15 CA and 20 CA. The results were plotted in a graph in which the horizontal axis indicates the discharging current and the vertical axis indicates the value of the voltage drop, and the slope of the graph was determined as the initial DCR.

(3) Charge-Discharge Cycle Test

Each lithium ion secondary battery was charged with a constant current of 10 CA up to a SOC of 80% under an environmental temperature of 45° C., and was then discharged with a constant current of 10 CA down to a SOC of 20%. Such a charge-discharge cycle was repeated for 200 hours. After that, the battery capacity and the DCR of the lithium ion secondary battery were measured using a method similar to that for the initial battery capacity and the initial DCR. The measured battery capacity was divided by the initial battery capacity to determine the capacity retention rate. In addition, the measured DCR was divided by the initial DCR to determine the rate of increase in the DCR.

Figure 6:
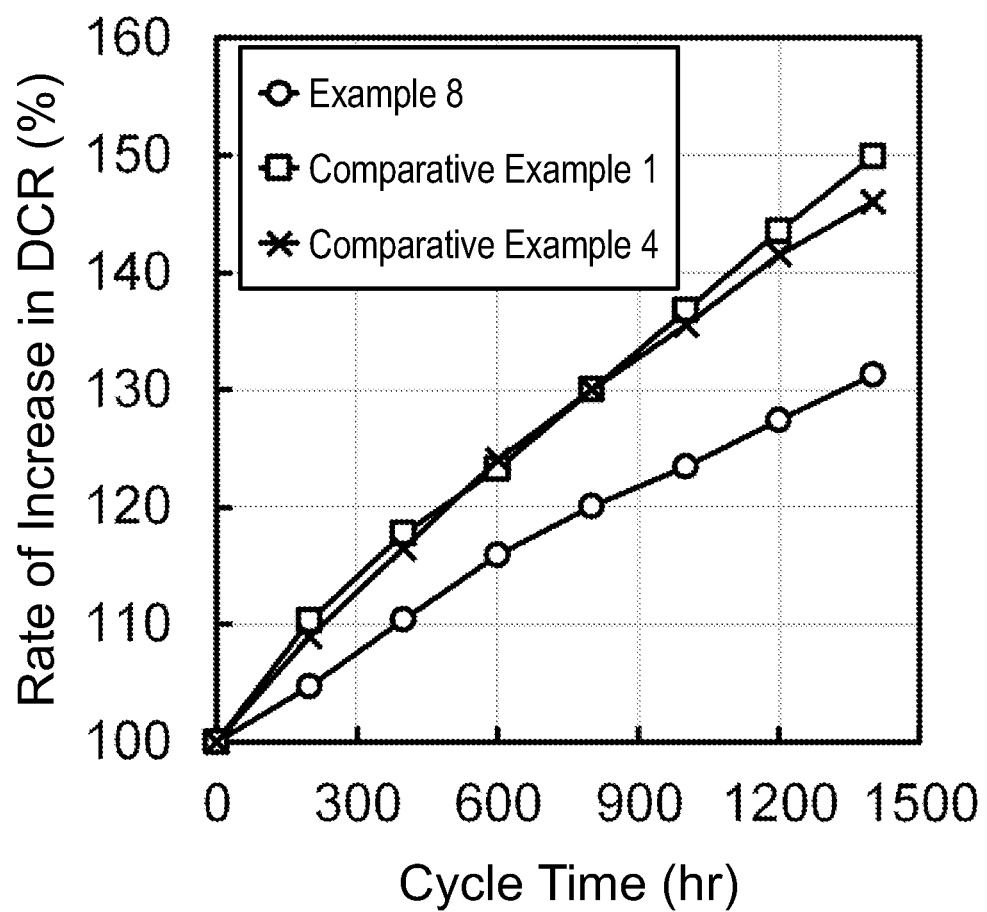
FIG. 6 is a graph illustrating the rate of increase in the DCR of each of lithium ion secondary batteries of Example 8, Comparative Example 1, and Comparative Example 4.

The aforementioned charging and discharging for 200 hours and the measurement of the battery capacity and the DCR were further repeated six times. FIG. 6 illustrates the rate of increase in the DCR of each of the lithium ion secondary batteries of Example 8, Comparative Example 1, and Comparative Example 4. In addition, Table 2 illustrates the capacity retention rate and the rate of increase in the DCR of each of the lithium ion secondary batteries of Examples and Comparative Examples after the charge-discharge cycles for a total of 1400 hours.

TABLE 2

|  | Initial Battery Capacity [%] | Capacity Retention Rate [%] | Rate of Increase in DCR [%] |
| --- | --- | --- | --- |
| Example 1 | 100 | 80 | 128 |
| Example 2 | 101 | 81 | 128 |
| Example 3 | 100 | 81 | 127 |
| Example 4 | 99 | 82 | 127 |
| Example 5 | 97 | 83 | 126 |
| Example 6 | 101 | 80 | 124 |
| Example 7 | 100 | 81 | 125 |
| Example 8 | 100 | 78 | 131 |
| Example 9 | 101 | 76 | 133 |
| Example 10 | 104 | 74 | 135 |
| Example 11 | 103 | 79 | 127 |
| Example 12 | 103 | 79 | 130 |
| Example 13 | 100 | 82 | 126 |
| Comparative Example 1 | 100 | 72 | 150 |
| Comparative Example 2 | 100 | 71 | 155 |
| Comparative Example 3 | 101 | 70 | 158 |
| Comparative Example 4 | 100 | 72 | 145 |
| Comparative Example 5 | 103 | 73 | 155 |
| Comparative Example 6 | 101 | 65 | 170 |

Usually, the initial battery capacity and the life of a lithium ion secondary battery have a trade-off relationship. However, each of the lithium ion secondary batteries of Examples 1 to 13 was found to have an initial battery capacity equivalent to those of the lithium ion secondary batteries of Comparative Examples 1 to 6, and have a higher capacity retention rate and a lower rate of increase in the DCR than those of Comparative Examples 1 to 6. In particular, from the results of evaluation of Examples 1 to 5 and Comparative Example 6, it was found that as the first positive-electrode active material has a composition that satisfies 0<a/(b+c)<1 and 1≤b/c, it is possible to suppress a decrease in the discharge capacity and an increase in the DC internal resistance of each lithium ion secondary battery due to charging and discharging. It was also found that a decrease in the discharge capacity and an increase in the DC internal resistance of each of the lithium ion secondary batteries of Examples 1, 7 to 9, and 11 are smaller than those of the lithium ion secondary battery of Example 10. Accordingly, it was found that as the second positive-electrode active material satisfies 1≤d/(e+f+g)≤4, it is possible to further suppress a decrease in the discharge capacity and an increase in the DC internal resistance of the lithium ion secondary battery due to charging and discharging.

REFERENCE SIGNS LIST

34 Positive electrode for lithium ion secondary battery
34*a* Positive-electrode current collector
34*b* Layered structure
51 Outermost layer
52 Innermost layer
53 Intermediate layer
100 Lithium ion secondary battery All publications, patents, and patent applications cited in this specification are incorporated herein by reference in their entirety.

The invention claimed is:

1. A positive electrode for a lithium ion secondary battery, comprising:
   a positive-electrode current collector; and
   a layered structure provided on the positive-electrode current collector,
   wherein:
   the layered structure includes an outermost layer most distant from the positive-electrode current collector, and an innermost layer closest to the positive-electrode current collector, the outermost layer contains a first positive-electrode active material represented by the following Formula (1):

   (1)

wherein X satisfies $-0.15 \leq X \leq 0.15$, $M^A$ represents an element group including Ni, Co, and Mn, and provided that proportions of Ni, Co, and Mn in all elements of $M^A$ are respectively represented by a (mol %), b (mol %), and c (mol %), a, b, and c satisfy $0 < a/(b+c) \leq 0.67$ and $1.4 \leq b/c \leq 2$, and the innermost layer contains a second positive-electrode active material represented by the following Formula (2):

   (2)

wherein Y satisfies $-0.15 \leq Y \leq 0.15$, $M^B$ represents an element group including Ni, Co, and at least one of Mn or Al, and provided that proportions of Ni, Co, Mn, and Al in all elements of $M^B$ are respectively represented by d (mol %), e (mol %), f (mol %), and g (mol %), d, e, f, and g satisfy $1 \leq d/(e+f+g) \leq 4$.

2. The positive electrode for the lithium ion secondary battery according to claim 1, wherein the layered structure further includes an intermediate layer between the outermost layer and the innermost layer.

3. The positive electrode for the lithium ion secondary battery according to claim 2, wherein the intermediate layer contains a third positive-electrode active material, each of the outermost layer, the innermost layer, and the intermediate layer further contains a binder and a conductive material, a proportion by weight of the conductive material in the intermediate layer is higher than a proportion by weight of the conductive material in each of the outermost layer and the innermost layer, a proportion by weight of the binder in the intermediate layer is lower than a proportion by weight of the binder in each of the outermost layer and the innermost layer, and a proportion by weight of the third positive-electrode active material in the intermediate layer is lower than a proportion by weight of the first positive-electrode active material in the outermost layer and a proportion by weight of the second positive-electrode active material in the innermost layer.

4. The positive electrode for the lithium ion secondary battery according to claim 1, wherein at least one of $M^A$ or $M^B$ further includes at least one of Zr, Ti, Cr, Fe, Cu, Zn, Ge, Sn, Mg, Ag, Ta, Nb, B, P, Ca, Sr, or Ba.

5. The positive electrode for the lithium ion secondary battery according to claim 1, wherein a, b, and c satisfy $0 < a/(b+c) \leq 0.54$ and $1.6 \leq b/c \leq 2$.

6. The positive electrode for the lithium ion secondary battery according to claim 1, wherein a, b, and c satisfy $0 < a/(b+c) \leq 0.43$ and $1.8 \leq b/c \leq 2$.

7. The positive electrode for the lithium ion secondary battery according to claim 1, wherein a, b, and c satisfy $0 < a/(b+c) \leq 0.33$ and $1.8 < b/c \leq 2$.

8. A lithium ion secondary battery comprising the positive electrode for the lithium ion secondary battery according to claim 1.

9. A method for producing the positive electrode for the lithium ion secondary battery according to claim 1, comprising concurrently applying a first composition containing a first positive-electrode active material and a second composition containing a second positive-electrode active material onto a positive-electrode current collector, and drying the first composition and the second composition.

* * * * *